United States Patent
Iqbal et al.

(10) Patent No.: US 11,460,594 B1
(45) Date of Patent: Oct. 4, 2022

(54) MITIGATING WIRELESS CHANNEL IMPAIRMENTS IN SEISMIC DATA TRANSMISSION USING DEEP NEURAL NETWORKS

(71) Applicant: KING FAHD UNIVERSITY OF PETROLEUM AND MINERALS, Dhahran (SA)

(72) Inventors: Naveed Iqbal, Dhahran (SA); Abdulmajid Lawal, Dhahran (SA); Azzedine Zerguine, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/741,038

(22) Filed: May 10, 2022

(51) Int. Cl.
  *G01V 1/28* (2006.01)
  *G01V 1/36* (2006.01)
  *G01V 1/30* (2006.01)
  *G06N 3/04* (2006.01)
  *G06N 3/063* (2006.01)

(52) U.S. Cl.
  CPC .............. *G01V 1/282* (2013.01); *G01V 1/30* (2013.01); *G01V 1/364* (2013.01); *G06N 3/0445* (2013.01); *G06N 3/063* (2013.01)

(58) Field of Classification Search
  CPC ........... G01V 1/282; G01V 1/30; G01V 1/364
  See application file for complete search history.

(56) References Cited

U.S. PATENT DOCUMENTS

| | | | |
|---|---|---|---|
| 7,822,112 B2 * | 10/2010 | Yang | H04L 25/03057 375/232 |
| 10,871,584 B2 * | 12/2020 | Jiao | G01V 1/282 |
| 11,105,942 B2 | 8/2021 | Alwon | |
| 2021/0063594 A1 | 3/2021 | Wang | |
| 2022/0066060 A1 | 3/2022 | Gillott | |
| 2022/0066061 A1 | 3/2022 | Moldoveanu | |

* cited by examiner

*Primary Examiner* — Bryan Bui
(74) *Attorney, Agent, or Firm* — Oblon, McClelland, Maier & Neustadt, L.L.P.

(57) ABSTRACT

An apparatus, method, and non-transitory computer readable medium that can mitigate wireless channel impairments in seismic data transmission using deep neural networks is disclosed. The apparatus includes a receiving circuitry to receive seismic data and a processing circuitry. The processing circuitry is configured to apply a blind system identification process to the seismic data to estimate a channel impulse response of the seismic data, apply an optimum equalization process to obtain estimated seismic data based on the channel impulse response, process the estimated seismic data to generate processed seismic data, classify the processed seismic data into a first group of seismic data each of which has a signal-to-noise ratio (SNR) less than an SNR threshold and a second group of seismic data each of which has an SNR no less than the SNR threshold, and enhance the SNR of each of the first group of seismic signals.

15 Claims, 18 Drawing Sheets

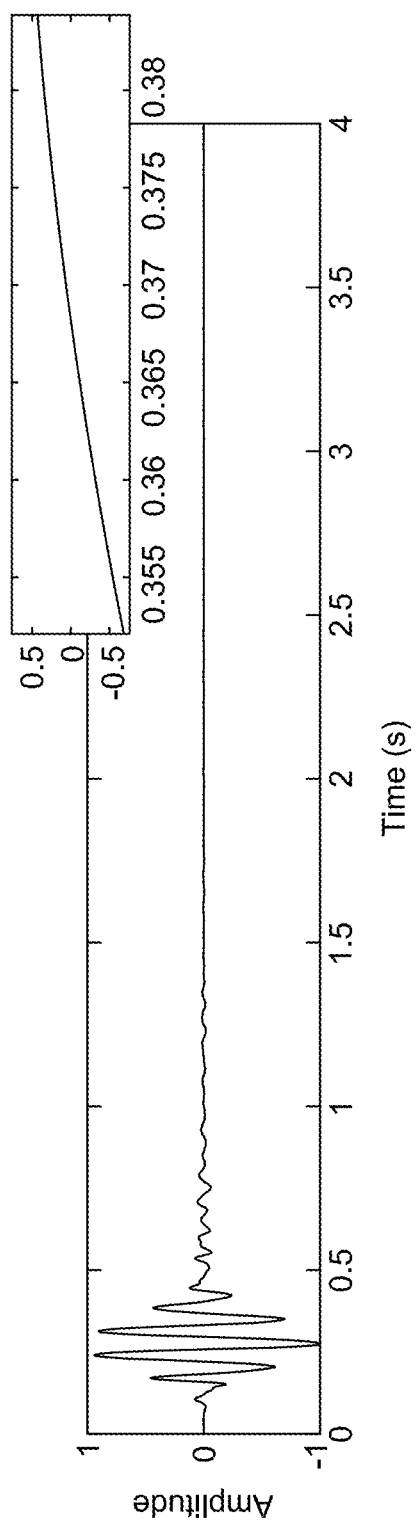

MITIGATING WIRELESS CHANNEL IMPAIRMENTS IN SEISMIC DATA TRANSMISSION USING DEEP NEURAL NETWORKS

BACKGROUND

Technical Field

The present disclosure is generally directed to wireless data transmission. In particular, the present disclosure relates to systems and methods for mitigating wireless channel impairments in seismic data transmission using deep neural networks.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

Seismic data is collected by monitoring various seismic activities using respective seismic detectors. For example, in the case of marine seismic activity detection, hydrophones are utilized to measure pressure fluctuations in the water caused by incoming seismic waves. In another example, for land surveys, geophones are employed to measure vector quantities, such as displacement, velocity, or acceleration. A geophone array is laid out on the ground with the geophones in an approximate grid formation. A land survey typically involves deploying seismic source(s) and seismic receivers at predetermined locations at or near the surface of the Earth. The seismic sources generate seismic waves, and then, part of the energy emitted by the sources is reflected from the geological formations toward the surface and reaches the seismic receivers. Measurement of the reflected/refracted waves, measured at the seismic receiver, predicts the seismic activity.

In conventional seismic acquisition networks, data collected by the geophones is transmitted through cable-based systems. For large surveying areas, cable-based data transmission could be an ineffective system due to the heavy-weight and cost of the cables required for data transmission. Therefore, a wireless data transmission system that is robust and capable of transmitting a huge amount of seismic data, with utmost efficiency, to a data collection center is required.

In recent years, wireless seismic data transmission systems have been implemented to replace cable-based transmission systems. Yet, two major changes remain to be addressed. First, the seismic data, despite its huge quantity, should reach the data collection center within the predetermined time frame. Second, while emphasizing timely data transmission, quality of data transmission signals should not be compromised. To retain the quality of the signal, a method of mitigating the channel effects, such as interference, multi-path fading, and noise, can be implemented. In this method, periodic training signals are transmitted to estimate, and ultimately, remove the channel effects. However, the burden of additional training signals on a vast amount of seismic data to be transmitted leads to a worsening scenario as more time and bandwidth would require for the transmission of a combination of the training signal and the seismic data compared to only seismic data.

Methods for combining noise attenuation and wavefield reconstruction in seismic processing are disclosed. In an implementation, the method detects noisy traces using a machine learning algorithm, where the machine learning algorithm is trained on a training dataset. The identified noisy traces are classified as containing noise associated with the shot or isolated noise unrelated to the shot. The machine learning algorithm is configured to detect the frequency content of the isolated noise traces, and the parameters of a noise attenuation algorithm are determined for attenuating the noise.

Real-time identification of extraneous noise in seismic surveys is disclosed. In an implementation, machine learning components are used for detecting extraneous noise. Supervised learning can be used for classifying seismic surveys as containing noises or not.

Each of the aforementioned methods and systems suffers from one or more drawbacks hindering their adoption. Accordingly, it is one object of the present disclosure to provide methods and systems for mitigating channel impurities and enhancing signal quality based on a deep neural network.

SUMMARY

In an exemplary embodiment, an apparatus, for mitigating wireless data impairments in seismic data transmission using a deep neural network, mainly includes, but may not be limited to, a receiving circuitry and a processing circuitry. The receiving circuitry is configured to receive seismic data reflected/refracted from the Earth's subsurface layers. The seismic data received by the receiving circuitry is processed for effective data transmission by the processing circuitry. According to the embodiment, the processing circuitry is coupled to the receiving circuitry. In one implementation, the processing circuitry is configured to apply a blind system identification process to the seismic data to estimate a channel impulse response of the seismic data. In one implementation, the processing circuitry is further configured to apply an optimum equalization process to obtain estimated seismic data based on the channel impulse response. In one implementation, the processing circuitry is configured to process the estimated seismic data to generate processed seismic data. In one implementation, the processing circuitry is further configured to classify the processed seismic data into a first group of seismic data each of which has a signal-to-noise ratio (SNR) less than an SNR threshold, and a second group of seismic data each of which has an SNR no less than the SNR threshold. In one implementation, the processing circuitry is further configured to enhance the SNR of each of the first group of seismic signals.

In another exemplary embodiment, a method, for mitigating wireless data impairments in seismic data transmission using a deep neural network, is described. The method includes receiving seismic data that is reflected/refracted from the Earth's subsurface layers by using the seismic receivers. The method further includes applying a blind system identification process to the received seismic data to estimate a channel impulse response of the seismic data. The method further includes applying an optimum equalization process to obtain estimated seismic data based on the channel impulse response. The method further includes processing the estimated seismic data to generate processed seismic data. The method further includes classifying the processed seismic data into the first group of seismic data each of which has a signal-to-noise ratio (SNR) less than an SNR threshold and the second group of seismic data each of which has an SNR no less than the SNR threshold. The method further includes enhancing the SNR of each of the first group of seismic signals.

In another exemplary embodiment, a non-transitory computer-readable medium has instructions stored thereon that, when executed by one or more processors, cause the one or more processors to perform a method for mitigating wireless data impairments in seismic data transmission using a deep neural network. The method includes receiving seismic data, applying a blind system identification process to the seismic data to estimate a channel impulse response of the seismic data, applying an optimum equalization process to obtain estimated seismic data based on the channel impulse response, processing the estimated seismic data to generate processed seismic data, classifying the processed seismic data into the first group of seismic data each of which has a signal-to-noise ratio (SNR) less than an SNR threshold and the second group of seismic data each of which has an SNR no less than the SNR threshold, and enhancing the SNR of each of the first group of seismic signals.

In one embodiment, the blind system identification process is a structured-based subspace (SSS) method.

In one embodiment, the optimum equalization process is a maximum likelihood sequence estimation (MLSE) process.

In one embodiment, estimated seismic data are processed using a short-time Fourier transform (STFT) process.

In one embodiment, the estimated seismic data is processed using a short-time discrete cosine transform (STDCT) process.

In one embodiment, the processed seismic data is classified using a fully connected neural network (FCNN) having a plurality of fully connected (FC) layers, each of which is followed by batch normalization (BN) and LeakyRule.

In one embodiment, the SNR of the first group of seismic data is enhanced using a recurrent neural network (RNN).

In one embodiment, the SNR of the first group of seismic data is enhanced using a convolutional neural network (CNN).

In one embodiment, the channel impulse response is updated to obtain an updated channel impulse response. An optimum equalization process is performed to obtain estimated seismic data based on the channel impulse response which includes using an optimum equalization process to obtain estimated seismic data based on the updated channel impulse response.

In one embodiment, the channel impulse response is updated based on:

$$\bar{h}_i = \left(1 - \frac{1}{\alpha}\right)\bar{h}_{i-1} + \frac{1}{\alpha}\hat{h}_{i-1},$$

where $\hat{h}_i$ is the estimated channel impulse response and $\bar{h}_i$ is the updated channel impulse response at the $i^{th}$ shot.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10C depicts reconstructed trace after denoising, according to the certain embodiment.

DETAILED DESCRIPTION

Figure 1:
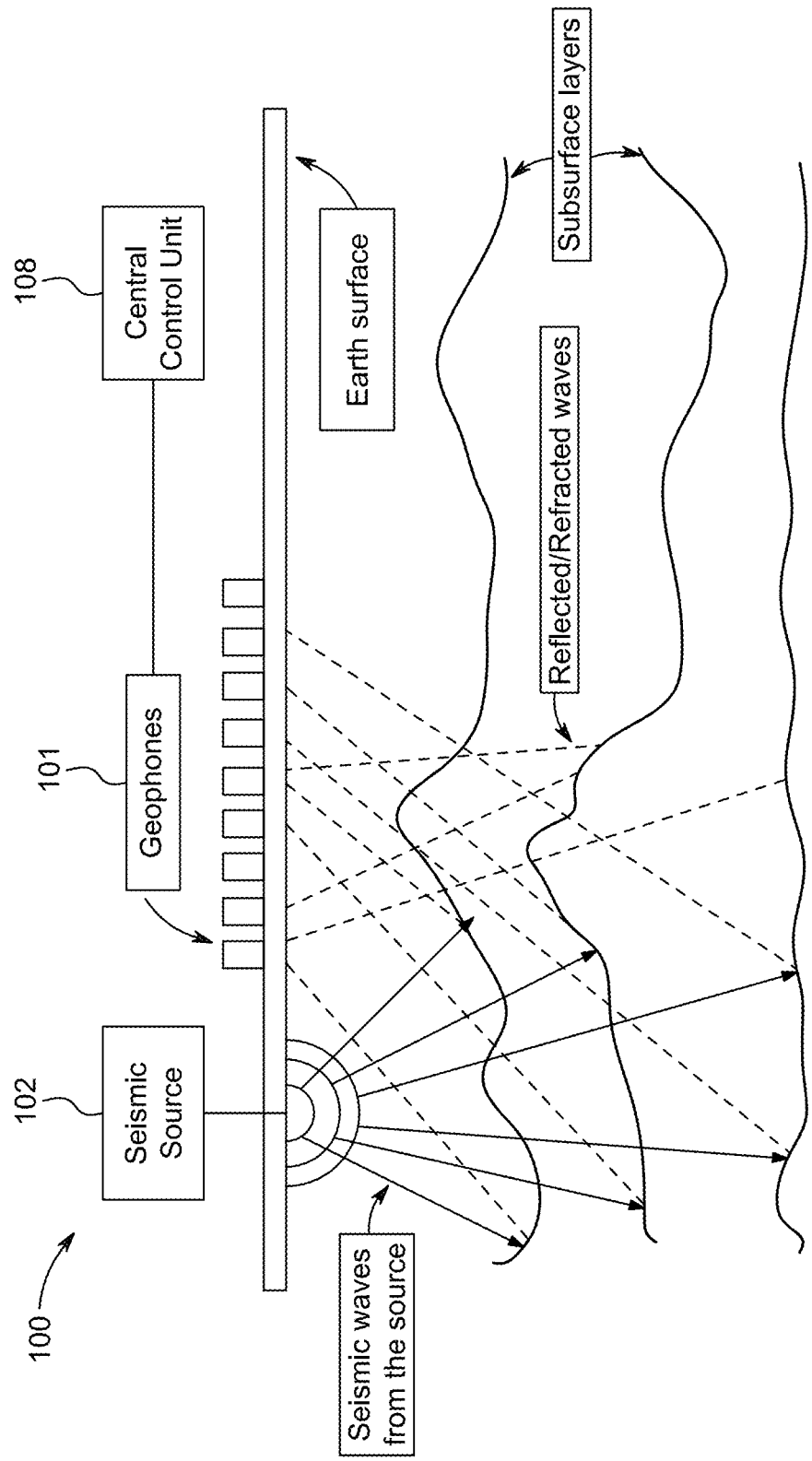
FIG. 1 is a schematic diagram a geological environment for seismic data detection, according to certain embodiments.

In the drawings, like reference numerals designate identical or corresponding parts throughout the several views. Further, as used herein, the words "a," "an" and the like generally carry a meaning of "one or more," unless stated otherwise.

S Furthermore, the terms "approximately," "approximate," "about," and similar terms generally refer to ranges that include the identified value within a margin of 20%, 10%, or preferably 5%, and any values therebetween.

Aspects of this disclosure are directed to mitigating wireless channel impairments in seismic data transmission using a deep neural network. As described earlier, current technologies rely on a machine learning module to detect noise traces or extraneous noise. Removal of the noise increases quality of the seismic data signal to some extent. However, just removal of noise may not be adequate to obtain efficient wireless data transmission. Therefore, the present disclosure describes a method of mitigating the channel effects, such as interference, multi-path fading, and noise, and improving signal to noise ratio of the signal using a deep neural network.

FIG. 1 depicts a geological environment 100 for seismic data detection, in accordance with an exemplary embodiment. The geological environment 100 may include, but may not be limited to a seismic source 102, an array of geophones 101, and a central control unit 108. In one implementation, the seismic source 102 may be configured to transmit, in a controlled environment, seismoelectric waves towards the Earth's surface and subsurface layers. For example, the seismic source 102 might be dynamite or a seismic vibrator that creates a seismic wave that propagates into the subsurface. The seismic wave, in one example, may be an acoustic wave. The produced seismic wave propagates at the surface and subsurface layers of the Earth, and then, is partially reflected towards the surface by seismic reflectors. The seismic reflectors can be interfaces between subsurfaces characterized by different elastic properties. The reflected signals are then detected and recorded by seismic receivers located at or near the surface of the Earth. In one implementation, the array of the geophones 101 may be implemented on or near the surface to receive the reflected seismic waves. The array of the geophone, thereby, may generate electric signals corresponding to the reflected seismic wave indicating the subsurface formation, positions, and activities. The electrical signal may be embedded with information regarding the subsurface and captured as a record of seismic data.

According to one embodiment, the array of the geophones 101 may be implemented as such to create a dense field of sensors. In one example, the array of the geophone may be implemented as a vertical component of geophones 101. In another example, the array of the geophone may be implemented as horizontally aligned geophones 101. In a still further implementation the geophones are implemented as a cone such that the geophone at the apex of the cone is the deepest buried geophone which is surrounded by consecutively expanding circles of geophones with each successive geophone at a depth in the earth less than the depth of a predecessor circle until the last circle in on the surface of the Earth. In another implementation, the sensor devices may be hydrophones or accelerometers, or a combination thereof.

The data gathered by sensors and the array of geophones 101 may be collected by a central control unit 108. The central control unit 108 may be configured to perform analysis or other data processing required for wireless data transmission. The central control unit 108, in one implementation, may be controlled by a controller 206 (shown in FIG. 2). The controller 206 may include a set of executable commands, which upon execution, can control the operations of the central control unit 108. In one implementation, the data collected by the sensors and the array of geophones 101 may be used alone or in combination with other data. The data may be collected in one or more databases and/or transmitted to a data collection center 214 (shown in FIG. 2). The data may be historical data, real-time data, or combinations thereof. The real-time data may be used in real-time, or stored for later use. The data may also be combined with historical data or other inputs for further analysis. The data may be stored in separate databases, or combined into a single database.

Figure 2:
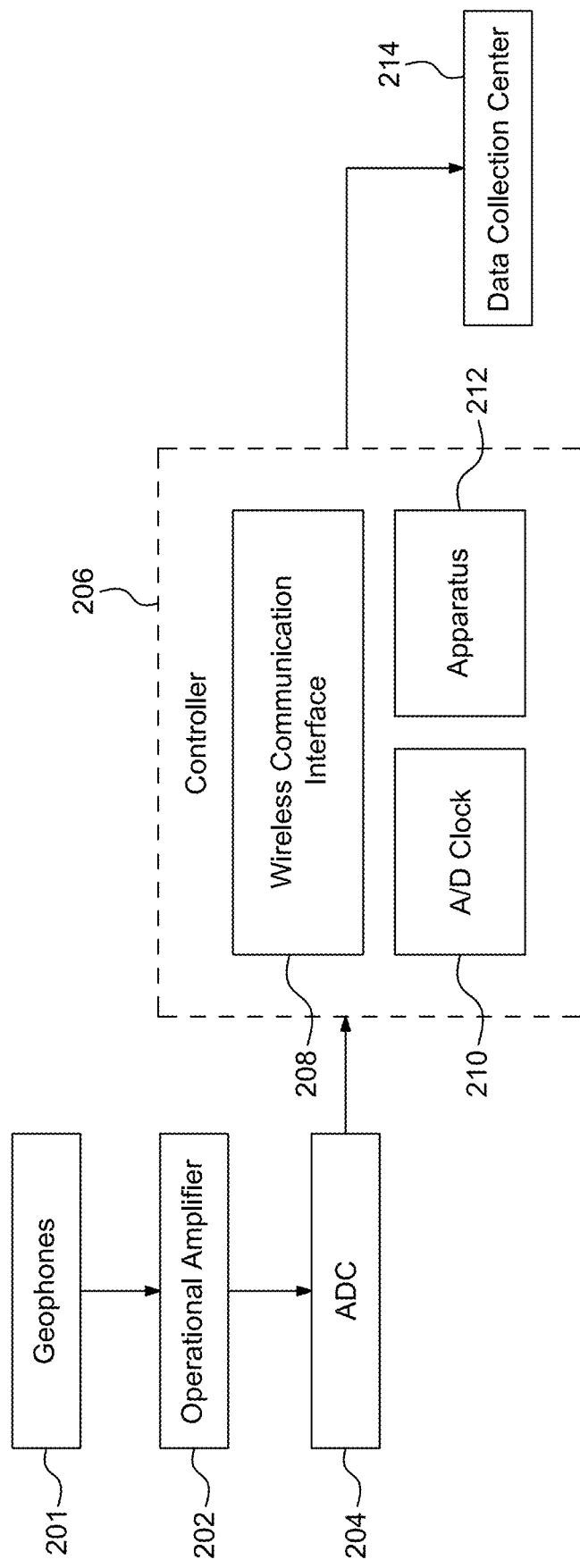
FIG. 2 depicts an exemplary general block diagram illustrating functional components of a seismic activity detection system, according to certain embodiments.

FIG. 2 depicts a general block diagram illustrating functional components of a seismic activity detection system, according to one embodiment. The geophones 101 as sensor devices are described in reference to FIG. 1. The array of geophones 201, is an array of the sensor devices implemented to gather seismic data in a similar way as that of geophone 101. The geophone 201 can collect seismic waves, and convert the seismic waves into an electrical signal. The electrical signal may be converted into a digital signal. The seismic digital signal may be transmitted to a controller 206 for analysis and signal processing. The controller 206 may include an apparatus 212, configured for mitigating wireless data transmission impairments and enhancing the signal. The enhanced signal may be transmitted to a data collection center 214 through a wireless communication unit. Details of each functional component are described in subsequent paragraphs.

In one implementation, the array of the geophones 201 is configured to receive reflected/refracted seismic data in analog form. The amplitude of the analog signal, corresponding to the received seismic data, is amplified by an operational amplifier 202, in one implementation. The operational amplifier 202 is a well-known component in the art, therefore, a detailed description of the operational amplifier 202 is not provided in this disclosure for the sake of brevity. The amplified analog signal may be converted into a digital signal by an analog-to-digital converter (ADC) 204, in accordance with one implementation. The digital signal generated by the ADC 204 is a digital representation of the recorded analog seismic data.

In one implementation, the digital signal may be fed to the controller 206 for digital signal processing. The controller 206 may include, but may not be limited to a wireless communication interface 208, an analog-to-digital clock 210, and an apparatus 212.

The wireless communication interface 208 may be configured to perform at least one of receiving the first signal or transmitting a second signal to the wireless communication unit in an implementation. In one example, the wireless communication interface 208 is configured to receive the first signal, e.g., a digital signal corresponding to a seismic wave, from ADC 204. In another example, the wireless communication interface 208 is configured to transmit the second signal. e.g. digitally processed and enhanced the first signal, to the data collection center 214. A wireless communication network, a wireless communication protocol, and/or parameters of wireless communication protocol may be selected in accordance with specific applications and requirements.

The wireless communication interface 208 may receive the first signal from the ADC 204 at the rate of the sampling frequency of the ADC 204. In one implementation, the A/D clock 210 may be configured to synchronize the digital signal reception in accordance with the sampling frequency of the ADC 204.

The apparatus 212, in one implementation, may be configured to mitigate wireless data transmission impairments in the digital signal using a deep neural network. The apparatus 212 is discussed in more detail with reference to subsequent figures. The apparatus 212 is capable of mitigating the impairments and enhancing the signal-to-noise ratio (SNR) prior to signal transmission to the data collection center 214.

Figure 3:
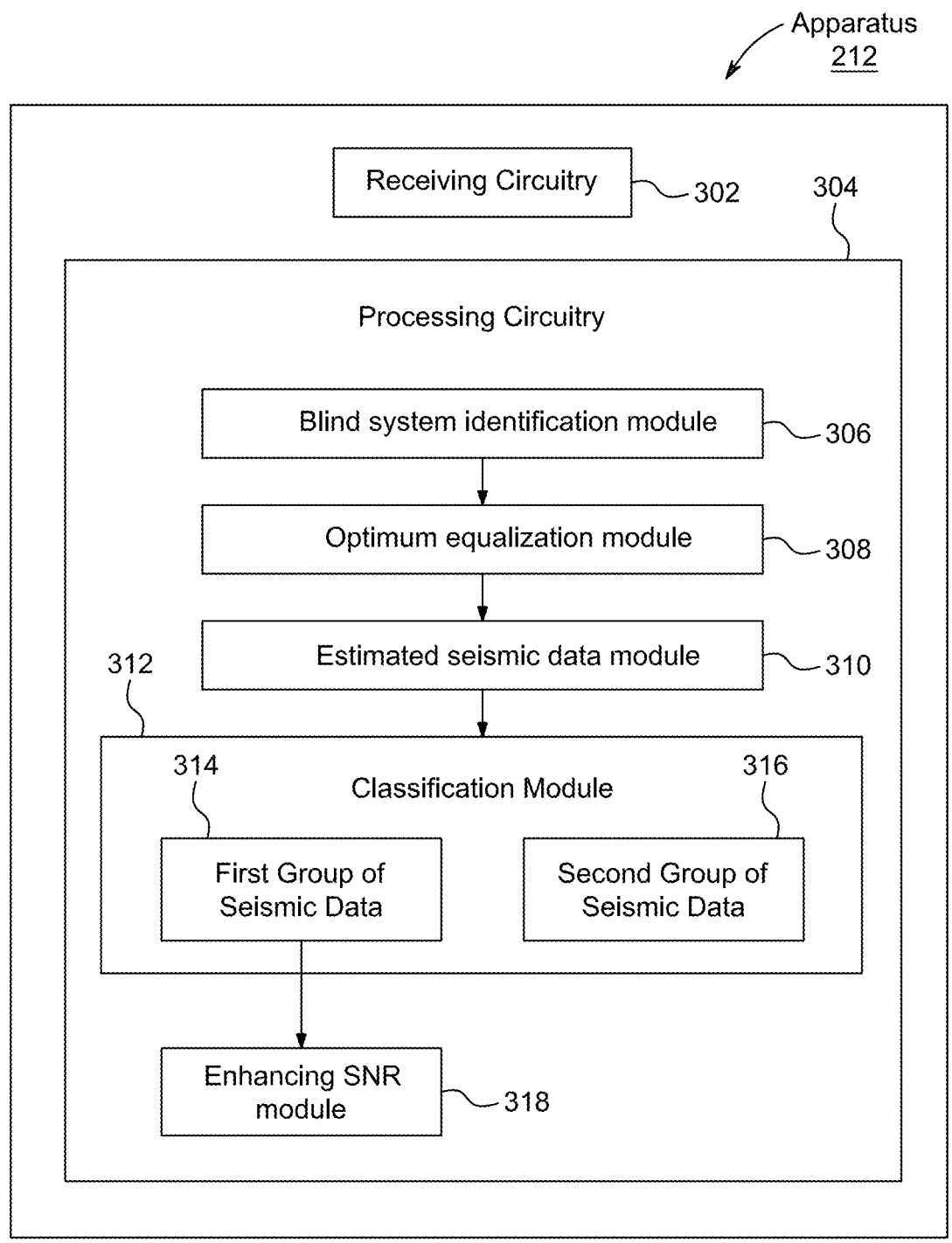
FIG. 3 depicts a functional block diagram of an apparatus, according to certain embodiments.

FIG. 3 depicts a functional block diagram of the apparatus 212, in accordance with an exemplary embodiment. The apparatus 212 is capable of efficiently mitigating the channel effects without using additional training signals. In one example, a stream of digitized samples drawn from a single geophone is referred to as a "seismic channel" or "channel." For mitigating the channel effects, the apparatus 212 mainly relies on blind system identification and deep neural network approach. The blind system identification is a technique well known in the art that estimates the channel without using any training signal. A deep neural network is implemented to perform blind system identification without the use of additive noise.

The apparatus 212, as shown in FIG. 3, may include, but may not be limited to, a receiving circuitry 302 and processing circuitry 304, according to one embodiment. In one implementation. The receiving circuitry 302 may be implemented to receive at least one signal, for example, the first signal, from the wireless communication interface 208, as described in FIG. 2. In one implementation, the first signal may be fed to the processing circuitry 304, by the receiving circuitry 302, to perform digital processing for mitigating the channel effects corresponding to the first signal.

According to the embodiment, the processing circuitry 304 may include, but may not be limited to a blind system identification module 306, an optimum equalization module 308, an estimated seismic data module 310, a classification module 312, and an enhancing SNR module 318.

Blind channel identification methods rely on a multichannel framework which is obtained either by using an array of antennas at the receiver side or oversampling the received signal. For example, each geophone of the array of the geophones 201 may be equipped with a transmitter that may transmit a large amount of data under stringent timing constraints, and therefore, oversampling at geophone is not feasible. Furthermore, oversampling or implementing multiple antennas at a geophone also increases the processing load on battery-driven wireless geophone. Therefore, for multichannel blind system identification, processing load, i.e., oversampling and multiple antennas, is shifted to the apparatus 212, where power and processing requirements are relaxed, from the geophones 201.

For example, assuming that a single geophone data passes through m independent channels before reaching the data collection center 214. The transmitted geophone data may reach data collection center 214 either by oversampling or antennas at the receiver end (not shown) A discrete channel model for the window of M received samples may be obtained by stacking the data into a vector/matrix representation, and it may be given as follows:

$$y_M(n) = H_M x_{M+L-1}(n) + z_M(n) \quad (1)$$

where the received data is $y_M(n) = [y^H(n), \ldots, y^H(n-M+1)]^H$ and the transmitted digital modulated data is $x_{M+L-1}(n) = [x(n), \ldots, x(n-M-L+2)]^T$. An additive random noise $z_M(n)$ is stacked in a way to $y_M(n)$, and $H_M$ is an mM×(M+L−1) block Toeplitz matrix. The matrix is given as:

$$H_M = \begin{bmatrix} h(0) & \cdots & h(L-1) & \cdots & 0 \\ \vdots & \ddots & \ddots & \ddots & \vdots \\ 0 & \cdots & h(0) & \cdots & h(L-1) \end{bmatrix}; \quad (2)$$

where $y(n) = [y_1(n), \ldots, y_m(n)]^T$, $h(i) = [h_1(i), \ldots, h_m(i)]^T$, and $z(n) = [z_1(n), \ldots, z_m(n)]^T$. The h may be considered as a desired vector with $h = [h^T(0) \ldots h^T(L-1)]^T$ containing all the channel's taps, and the objective is to estimate these channels' impulse responses, i.e., $\hat{h}$ using the observation data in (1). In different implementations, various subspace-based methods can be implemented for blind system identification. In one example, a structured-based subspace technique (SSS) may be used for blind system identification process. This technique can be efficient in ill-conditioned channel matrices. In this approach, the system/channel matrix $H_M$ can be searched in the form $H_M = V_x Q$ such that the orthogonality criterion is set to be equal to zero, i.e., $\|V_z^H \hat{H}_M\|^2 = 0$. Furthermore, Q is chosen such that the resulting matrix is close to the desired block Toepliz structure. The columns of matrices $V_x$ and $V_z$ span the signal and noise subspace, respectively.

As a person skilled in the art would understand, the geophones 201 and the data center locations are fixed for several shots, and, therefore, the channel impulse response is not expected to change. Note that the geophones 201 and the data center locations are fixed for several shots, and, therefore, the channel impulse response is not expected to change. This additional advantage is used to further enhance the channel estimation $\hat{h}$. As the seismic shooting process is repeated over and over again, the channels' impulse response for the $i^{th}$ shot is updated according to the following recursion:

$$\bar{h}_i = \left(1 - \frac{1}{\alpha}\right) \bar{h}_{i-1} + \frac{1}{\alpha} \hat{h}_{i-1}; \quad (3)$$

where $\hat{h}_i$ is the estimated channels' impulse response using the SSS method and $\bar{h}_i$ is the updated estimation at the $i^{th}$ shot.

Following to the blind system identification process, the optimum equalization process is performed by optimum equalization module 308, in accordance with one embodiment. For seismic signal recovery, γ shots may be used to get the final channel response $\bar{h}_\gamma$, and then optimum equalization method, i.e., Maximum Likelihood Sequence Estimation (MLSE), may be implemented to obtain a robust estimation of the transmitted signal R by the estimation seismic data module 310. The MLSE is a computationally expensive technique; however, the equalization is done offline at the data center. Therefore, even though MLSE is a computationally intensive approach, as it does not load the apparatus with computational infrastructure and deliver efficient results, MLSE can be a preferred method to achieve the best reconstruction of the seismic signal, in one example.

As described earlier, the blind system identification together with MLSE effective reconstruction of the seismic signal under a low noisy environment. However, the performance deteriorates under low SNR levels. Therefore, in one embodiment, an SNR enhancement may be implemented using deep neural networks. As the noise in (1) is random, the performance of the blind system identification method varies trace-by-trace. A trace is the acquired data by a geophone per shot. Traces that need SNR enhancement need to be differentiated from traces that do not. Therefore, in one implementation, traces are first classified based on the SNR level, and then the ones that need enhancement are fed to the SNR enhancement network. For traces classification, two deep neural networks may be employed. First deep neural network classifies the traces. Second deep neural network enhances the SNR. Raw seismic data are preprocessed before feeding to the deep neural networks.

In one implementation, the classification module 312 may be implemented for classifying the processed seismic data.

In particular, the classification module 312 may be configured to classify the traces in at least two groups. First group of seismic data 314 and second group of seismic data 316. In one example, the first group of seismic data 314 may represent the seismic data with SNR lower than an SNR threshold. In another example, a second group of seismic data 316 may represent the seismic data with SNR no lower than an SNR threshold. For classifying the traces in first or second group of seismic data, at least two deep neural networks are employed. The classification process is described in more detail with reference to FIG. 6.

According to one embodiment. SNR enhancement process may be performed on the first group of seismic data 314, having SNR lower than an SNR threshold, by the SNR enhancement module 318. In one implementation, SNR processes may include at least two stages. First stage is a preprocessing stage and second stage is a SNR enhancement stage.

In the preprocessing stage, a trace may be transformed to the 2D domain, according to one implementation. In one example, the trace may be transformed using a short-time Fourier transform (STFT). However, using the Fourier transform requires using complex numbers that double the complexity. To overcome this issue, the discrete cosine transform may be used instead. Therefore, it is called here as short-time discrete cosine transform (STDCT). The STDCT is a sequence of discrete cosine transforms applied on windowed sections of the data and sliding the window through the entire record. Application of STDCT on a windowed section of the data is called herein as a segment. The STDCT type-4V is defined for a window of size N as:

$$\hat{X}(k) = \sqrt{\frac{2}{N}} \sum_{n=1}^{N} \hat{x}(n) \cos\left(\frac{\pi}{4N}(2n-1)(2k-1)\right) \quad (4)$$

To find the inverse, k and n are switched in the above definition. The seismic waveforms may be transformed to the time-frequency domain using the STDCT with a rectangular window of size N=128 samples and an overlap of 90%. Using the STDCT, spectra of a trace in the time-frequency domain may be obtained. The noisy spectra may be used to get the clean spectra with the help of the deep neural network. To recover the time domain trace, a procedure similar to inverse STFT may be performed.

In one implementation, for the classification, a 2048-point discrete Fourier transform (DFT) may be performed on a whole trace, and then deep neural network for classification may decide about the further processing based on an absolute value of the transform. DFT is performed as follows:

$$\hat{C}(k) = \sum_{n=0}^{M-1} \hat{x}(n) e^{-j\frac{2\pi k n}{M}} k = 0, 1, \ldots, 2047, \quad (5)$$

where M is the trace length.

The reason for transformation to the frequency domain is that the deep neural networks are able to better learn the specific frequency-domain seismic data characteristics/features and, thus, generalize effectively.

After the preprocessing stage, the SNR enhancement stage is performed to obtain SNR enhancement in one implementation. Given segments of noisy spectra $\{\hat{X}(n)\}_{n=1}^{M/0.1N}$ and clean spectra $\{X(n)\}_{n=1}^{M/0.1N}$, a mapping f has to be learned. The mapping f generates segments of 'denoised' spectra $\{f(\hat{X}(n))\}_{n=1}^{M/0.1N}$ that approximate the clean spectra using the $l_2$ norm, e.g., $$\min \sum_{t=1}^{M/0.1N} \|X(n) - f(\hat{X}(n))\|_2^2, \quad (6)$$

The f may be formulated using a deep neural network, in one implementation. If the f is a recurrent type of network, the temporal behavior of input spectra may already be addressed by the network, and thus, objective of (6), i.e., mapping f suffices. On the other hand, for a convolutional type network, the past $\lfloor \Delta/2 \rfloor$ noisy segments $\{\hat{X}(i)\}_{i=n-\lfloor \Delta/2 \rfloor}$, the future $\lfloor \Delta/2 \rfloor$ noisy segments $\{\hat{X}(i)\}_{i=n}^{n+\lfloor \Delta/2 \rfloor}$ and the current noisy segment R(n) are considered to denoise the current segment of noisy spectra, e.g., $$\sum_{n=1}^{M/0.1N} \|X(n) - f(\hat{X}_{n-\lfloor \Delta/2 \rfloor}, \ldots, \hat{X}_{n-\lfloor \Delta/2 \rfloor})\|_2^2 \quad (7)$$

In one example, the value of Δ is set to 7, which may be obtained empirically.

Figure 4:
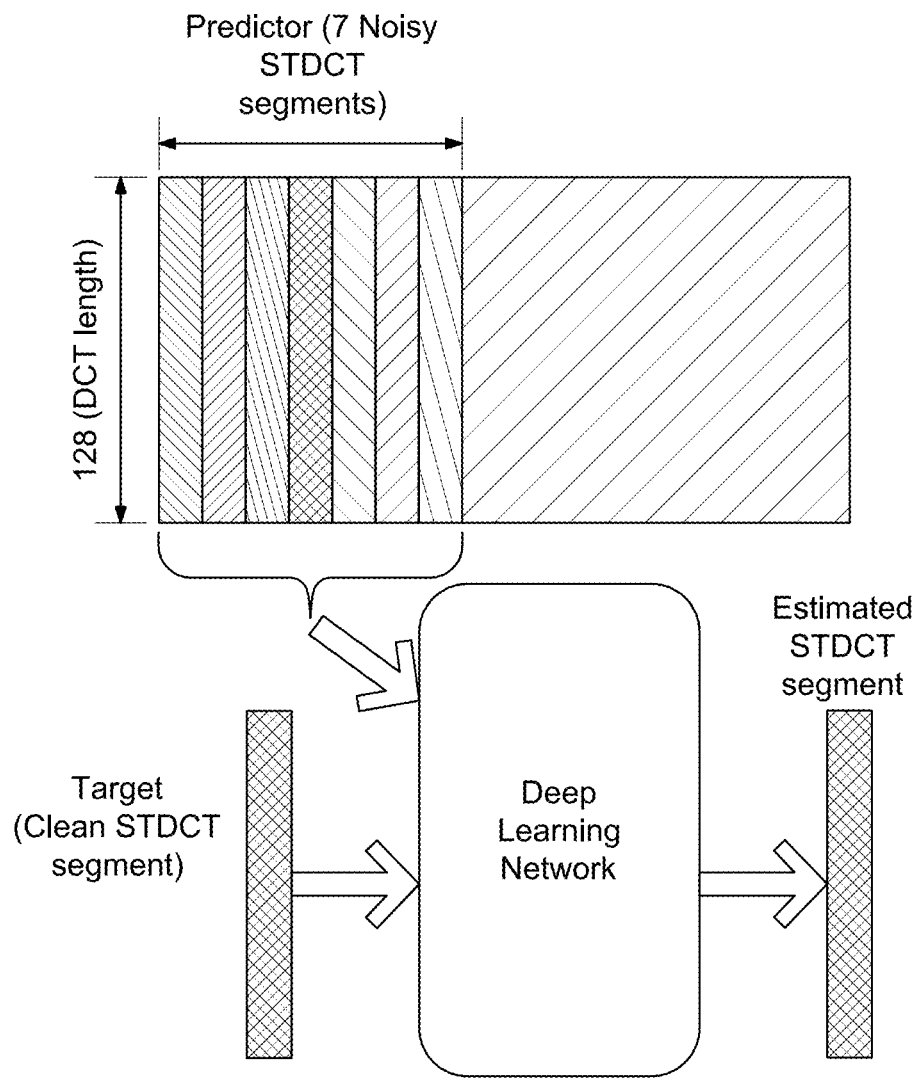
FIG. 4 illustrates the schematic diagram of a denoising network, according to certain embodiments.

FIG. 4 illustrates the schematic diagram of the denoising network, in accordance with one embodiment. In an implementation, seven noisy STDCT segments may be provided as the input to the deep convolutional neural network to get a clean STDCT segment. In one example, the output may be the cleaned middle segment. The design of the denoising network is more effective as compared to just having a network that maps input to the output for performing the denoising task.

Figure 5:
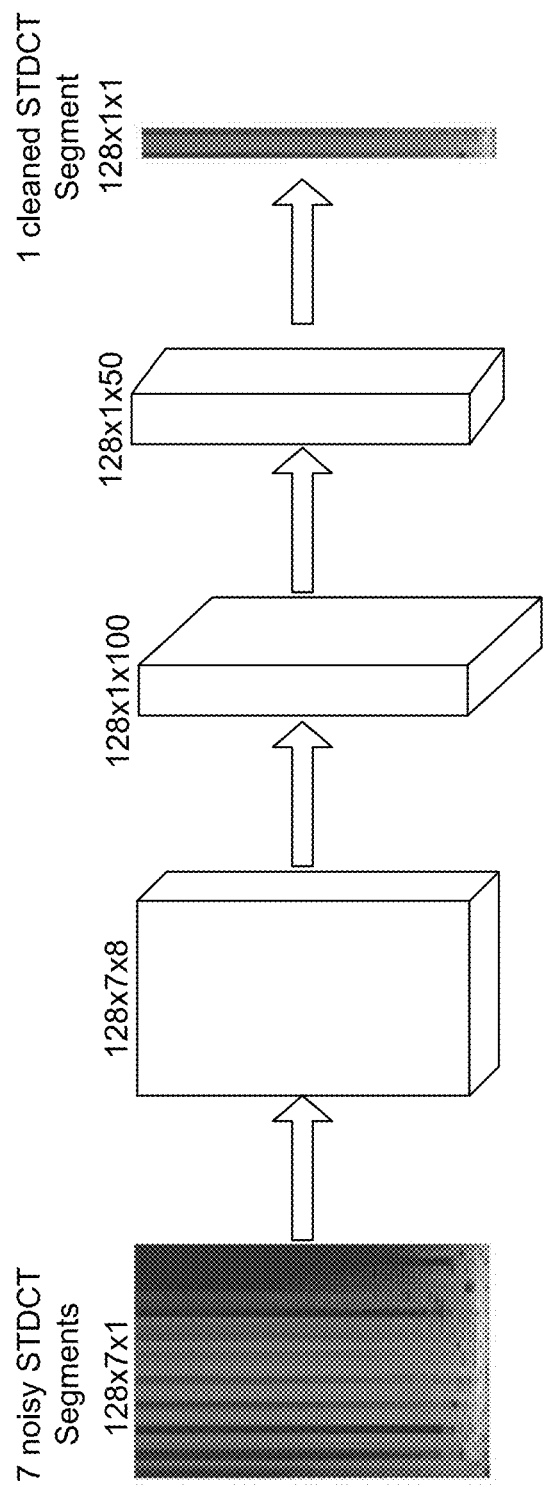
FIG. 5 illustrates a deep convolutional neural network for SNR enhancement with convolutional and LeakyRelu layers, according to certain embodiments.

FIG. 5 illustrates a deep convolutional neural network for SNR enhancement with convolutional and LeakyRelu layers. As known in the art, LeakyRelu is a version of a rectified linear unit which allows a small gradient when the unit is not active. The fully convolutional network may comprise at least four convolutional layers. The first three (3) convolutional layers may have a filter height of 50 each, and the number of filters is 8, 100, and 50, respectively, according to one implementation. The fourth convolutional layer may have a filter height of 20 with 1 filter. In this network, convolutions are performed in only one direction, i.e., along the frequency dimension, and the filter size along the time dimension is set to 1 (filter width=1) for all layers except for the first layer which is seven (7). Each convolutional layer may be followed by a leaky rectified linear unit (LeakyRelu) layer excluding the fourth layer. The activation function LeakyRelu is defined as follows:

$$g(s) = \begin{cases} 0.01s & \text{for } s < 0 \\ s & \text{for } s \geq 0 \end{cases} \quad (8)$$

where s is input to the activation layer. The deep convolutional network is shown in FIG. 5. The convolutional layers may include one or more other parameters, in one implementation. The other parameters may include a stride set to 1 along the horizontal and vertical directions for all layers except vertical direction for the second layer. For the vertical direction for the second layer, the stride is set to 7. In one implementation, Padding may be added to get the output of the same size as the input when the stride equals 1. If the stride is larger than 1, then the output size may be (input size/stride), where input size is the height or width of the input and stride is the stride in the corresponding dimension.

According to one implementation, one or more parameters may be used for optimization. Convolutional layer weights are initialized, and biases are set to zeros. The network is trained using backpropagation with gradient descent optimization and adaptive learning rates with a mini-batch size of 600. The initial learning rate is lr=0.001 with $\beta_1$=0.9, $\beta_2$=0.999, and $\epsilon$=10$^{-8}$. Furthermore, the learning rate is decreased by a factor of 0.9 every epoch. The training is stopped when validation loss does not decrease for more than 5 epochs. The loss function used to calculate the gradients is given as:

$$\mathbb{E}(\phi) = \sum_{q=1}^{128} \frac{1}{2}[t(q) - p(q)]^2; \qquad (9)$$

where p and t are the network prediction and target output, respectively. A regularization term is also added to the loss function $\mathbb{E}(\phi)$ to reduce the overfitting problem, i.e., $$\mathbb{E}_r(\phi) = \mathbb{E}(\phi) + \frac{\lambda}{2} w w^T.$$

The regularization factor $\lambda$ is set to 0.00005.

Figure 6:
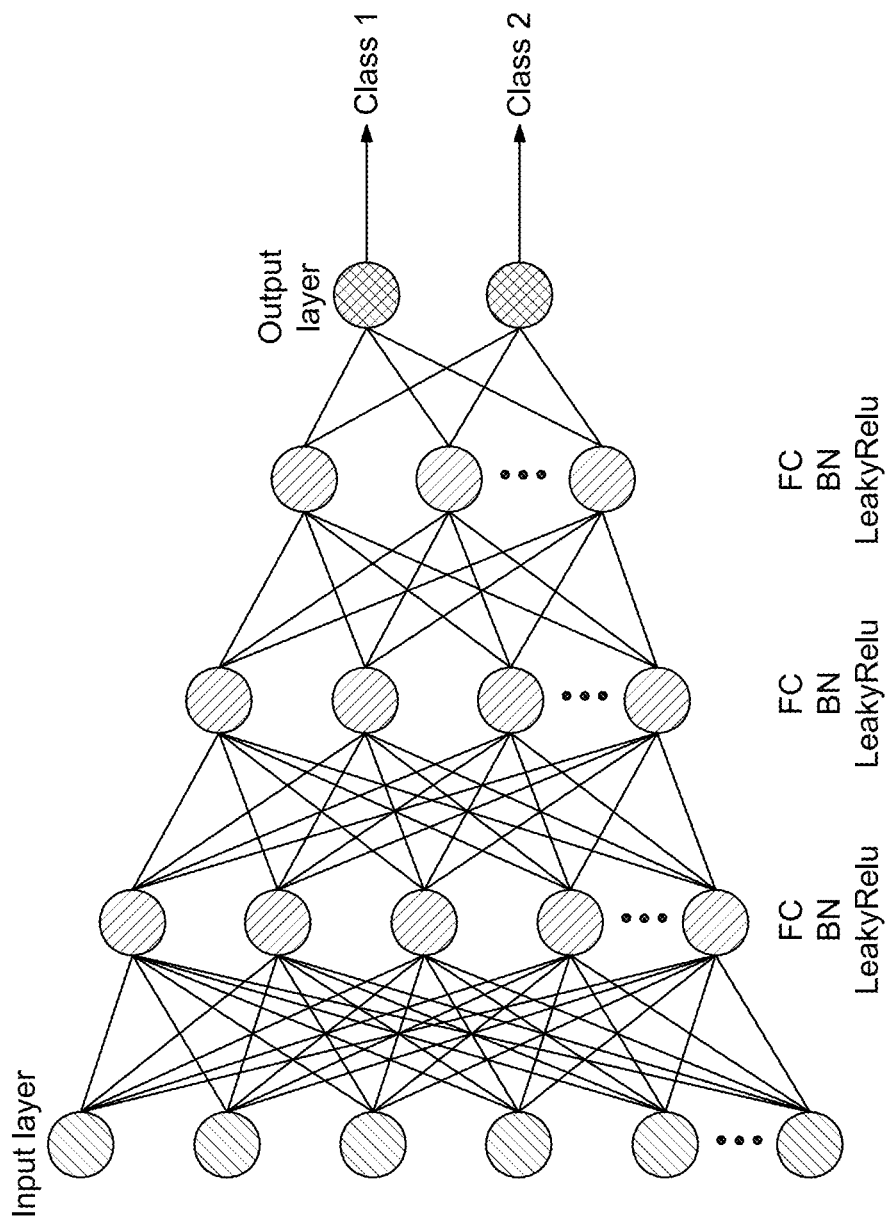
FIG. 6 illustrates a fully connected neural network for classification, according to certain embodiments.

FIG. 6 illustrates a fully connected neural network for classification, according to one embodiment. As described earlier, the traces are classified based on the SNR after MLSE. In one implementation, the classifier network may include at least three fully connected (FC) layers with neurons 1024, 512, and 341, respectively. Each FC layer may be followed by batch normalization (BN) and LeakyRelu. This deep neural network decides which trace needs SNR enhancement. As a result, the output is a binary decision. The decision is based on the SNR after MLSE, i.e., if SNR is greater than 40 dB then trace is assumed to be recovered, and on the other hand, it is further processed using the deep neural network for SNR enhancement. The reason for determining the threshold at 40 DB is that the trace with SNR=40 dB is considered as near-lossless. The optimization parameters are the same as before except for $\lambda$=10$^{-4}$ and lr is kept constant.

Figure 7:
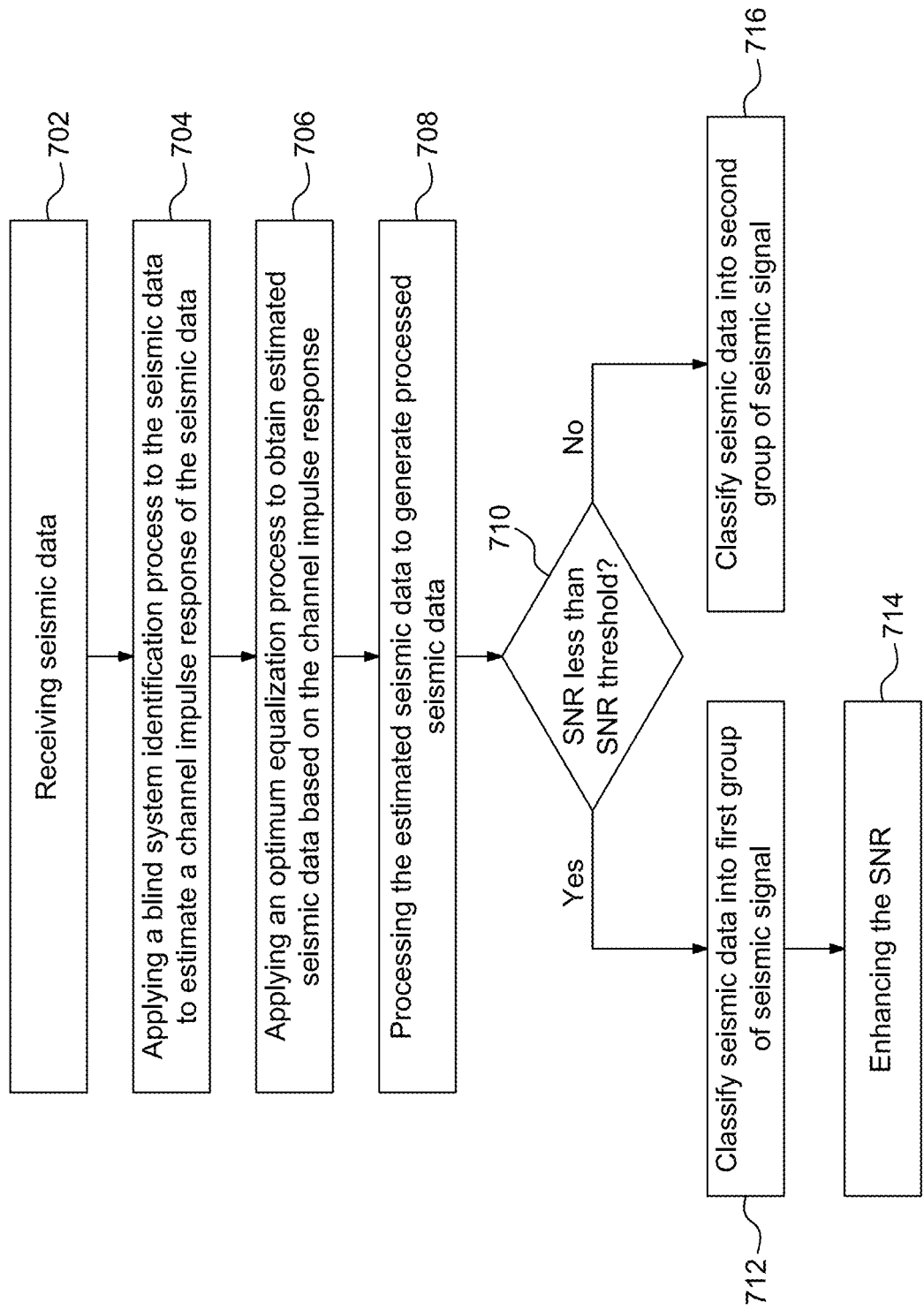
FIG. 7 illustrates the method workflow for the SNR enhancement, according to certain embodiments.

FIG. 7 illustrates the method workflow for the SNR enhancement, according to one embodiment. At method step 702, seismic data is received by the receiving circuitry 302 through wireless transmission. Wireless communication network, wireless communication protocol, and wireless communication protocol parameters can be determined and selected based upon application specifications.

In one implementation, at method step 704, a blind system identification process is performed, by the blind system identification module 306, on seismic data to estimate a channel impulse response of the seismic data.

In one implementation, at method step 706, optimum equalization is performed, by the optimum equalization module 308, to obtain estimated seismic data based on the channel impulse response.

In one implementation, at method step 708, the estimated seismic data is processed, using the estimation seismic data module 310, to generate processed seismic data.

At method step 710, it may be determined whether SNR is less than the SNR threshold.

In one implementation, at method step 712, the processed seismic data is classified, by a classification module 312, into a first group of seismic data 314 having SNR lower than SNR threshold.

In one implementation, at method step 714, the SNR of the first group of seismic signals is enhanced by enhancing SNR module 318.

At method step 716, the processed seismic data is classified, by a classification module 312, into a second group of seismic data 316 where SNR is no lesser than the SNR threshold.

According to an embodiment, non-transitory computer readable medium having program instructions stored therein that, when executed by one or more processors, may cause the one or more processors to perform the method 700.

The apparatus described with FIG. 3 and the method to operate the apparatus as described in FIG. 7 is implemented in an exemplary implementation. The resulting parameters and operational aspects are described with reference to FIG. 8-FIG. 11 herein.

Deep neural networks are usually trained based on synthetic training data. The training data can be generated using one or more methods. In one example, the training data is generated by a Marmousi model. The Marmousi model is often used in exploration seismology. In this particular model, the seismic receivers are placed at a distance of 50 m on the horizontal axis, and the shots are sequentially generated at the same location as every other receiver. The shot records are generated using the various seismic signatures. In one example Ormsby wavelet is used with frequencies 10-15-65-70, 0-15-70-80, 0-5-45-70, 0-5-55-60, 5-10-55-60, 0-565-70, 0-5-45-50, and 10-15-50-55 Hz. Different frequencies are used for the Ormsby wavelet to ensure the generation of maximum training data. With a variety of training data, generate at different frequencies, the deep neural networks can be well-trained and used for a variety of data sets. The frequency spectrum of the Ormsby wavelet is of trapezoidal shape which gives more flexible control on frequency domain than Ricker wavelet, which results in reconstruction of the seismograms similar to the real seismic data. In this particular mode, for the generation of synthetic data, the Matlab package is used. The sampling frequency is set to 4 kHz. Furthermore, the training data are randomized before being given to the neural networks and then shuffled after every epoch. The input (predictors P) and output (targets T) training data are z-normalized for both neural networks as follows:

$$\overline{P} = \frac{P - \mu_p}{\sigma_p}, \overline{T} = \frac{T - \mu_t}{\sigma_t}; \qquad (10)$$

where $\mu\_p$ ($\mu\_t$) and $\sigma\_p$ ($\sigma\_t$) are the mean and variance of P(T), respectively. Furthermore, 10% of the data are used for validation. In an example, the neural networks are first trained on the synthetic training data obtained using the Marmousi model. To obtain noisy synthetic data, the raw data are first obtained and then converted from analog form to digital form. Then, the digital data is randomly flipped about 10% of the bits corresponding to a trace. The noisy data are mixed with the original raw data for training the classifier neural network. In order to verify the performance, the classifier neural network is evaluated on publicly available seismic data, for example, the seismic data available from Utah Tomography & Modeling/Mitigation Consortium (UTAM). In this dataset, each trace has 4000 samples with the sampling frequency of $f_s$=4 kHz. Before the preprocessing stage, the data are cleaned by removing bad traces due to geophones not operating properly. The channel length is set to L=5 and Rayleigh fading is assumed. Furthermore, m=32 and M=5, and Binary Phase Shift Keying (BPSK) modulation is used in the simulations.

Figure 8:
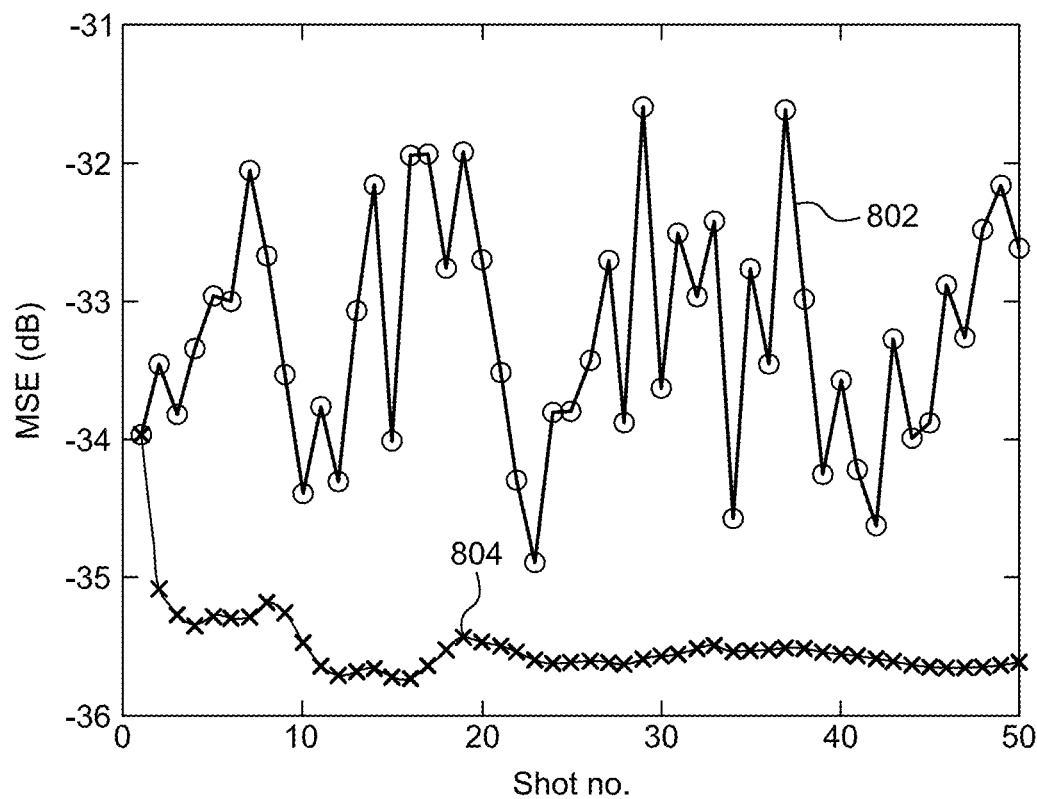
FIG. 8 shows graphical representation of the comparison between the SSS method and the method with enhanced SNR, according to certain implementation

FIG. 8 shows a comparison between the SSS method and the method with enhanced SNR, according to one implementation. The estimation of the channel impulse response is enhanced tremendously. As the estimation is leveling off around 50 shots, as shown by the curve 804 the final estimated channel impulse response is $\bar{h}_{50}$. Moreover, a large variation in estimation is observed for various traces 802 in the case of the SSS method due to the random noise. Therefore, in some traces recovery might be worst and in turn, further seismic data processing steps like stacking may provide poor overall results (due to error accumulation).

Figure 9:
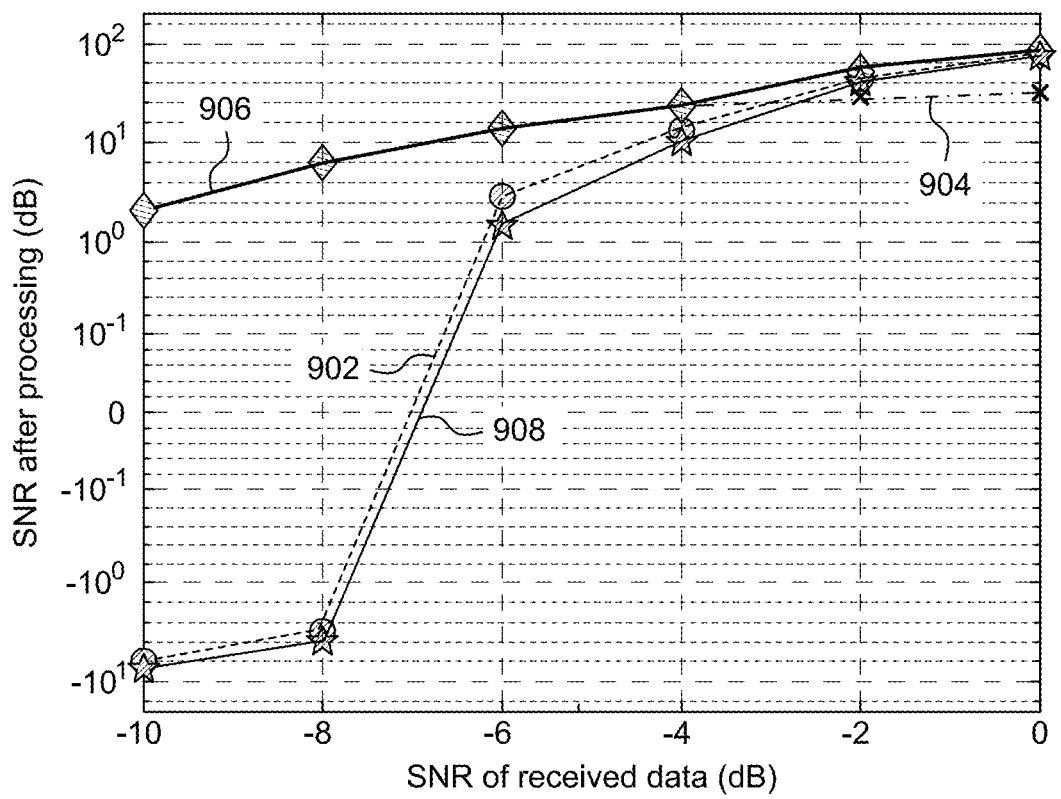
FIG. 9 shows SNR enhancement using deep convolutional neural network, according to certain embodiments.

FIG. 9 shows SNR enhancement using deep convolutional neural network, in accordance with present implementation. In particular, FIG. 9 depicts the comparison between the SSS method and SNR enhancement with or without the classifier network are compared and reported in FIG. 9. Curve 902 depicts values after MLSE using $\bar{h}_{50}$. Curve 904 depicts values after SNR enhancement without using classifier network. Curve 906 depicts values after SNR enhancement with classifier network. Curve 908 depicts values after MLSE using $\hat{h}_i$. SNR is obtained by averaging the respective values over all traces. FIG. 9 depicts that significant performance improvement is achieved through pre-trained deep neural networks, particularly at high noise levels. For instance, at the SNR of −10 dB of the received data, a nearly 10 dB increase in SNR is achieved, while at the SNR of 0 dB of the received data, about 120 dB increase in SNR is observed. It can be observed from the graph that with only the SNR enhancement network, the performance deteriorates at low noisy environments due to the robust estimation of the channel impulse response. The SNR of received data, in practical scenarios, is not known. Therefore, a pre-trained classifier network without transmitting any training signal to the data center for estimating SNR is utilized in one implementation.

Figure 10A:
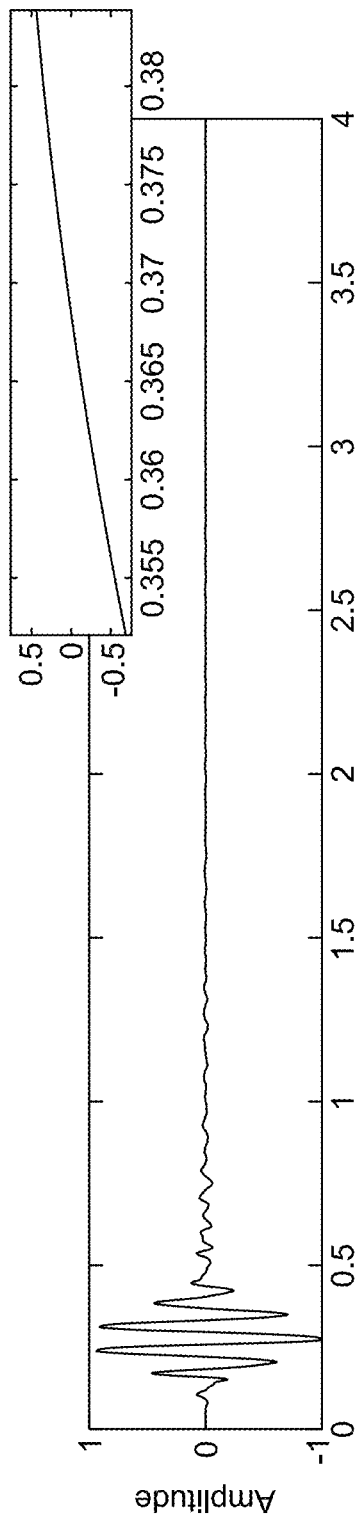
FIG. 10A depicts the original trace, according to certain embodiments.
Figure 10B:
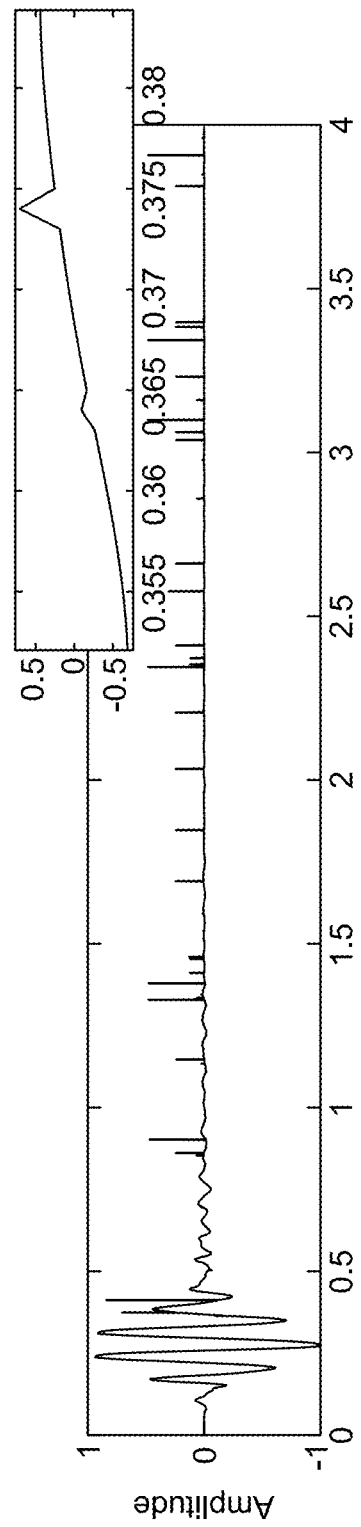
FIG. 10B depicts reconstructed trace after MLSE without denoising, according to certain embodiments.

In order to show the SNR improvement single trace, in one implementation, the method is simulated for the SNR of received data of −5 dB. FIG. 10A-FIG. 10C compare the reconstructed trace with the original trace and depict single trace SNR enhancement, in accordance with one implementation. FIG. 10A depicts the original trace, FIG. 10B depicts reconstructed trace after MLSE without denoising and FIG. 10C depicts reconstructed trace after denoising. The improvement can be seen before and after using pre-trained neural networks. The spikes in the received data are significantly removed by the denoising network, which is clear from the expanded version of FIG. 10A-FIG. 10C. Some examples from the experimental results using real/field data with different levels of noise are shown in FIG. 11.

Figure 11:
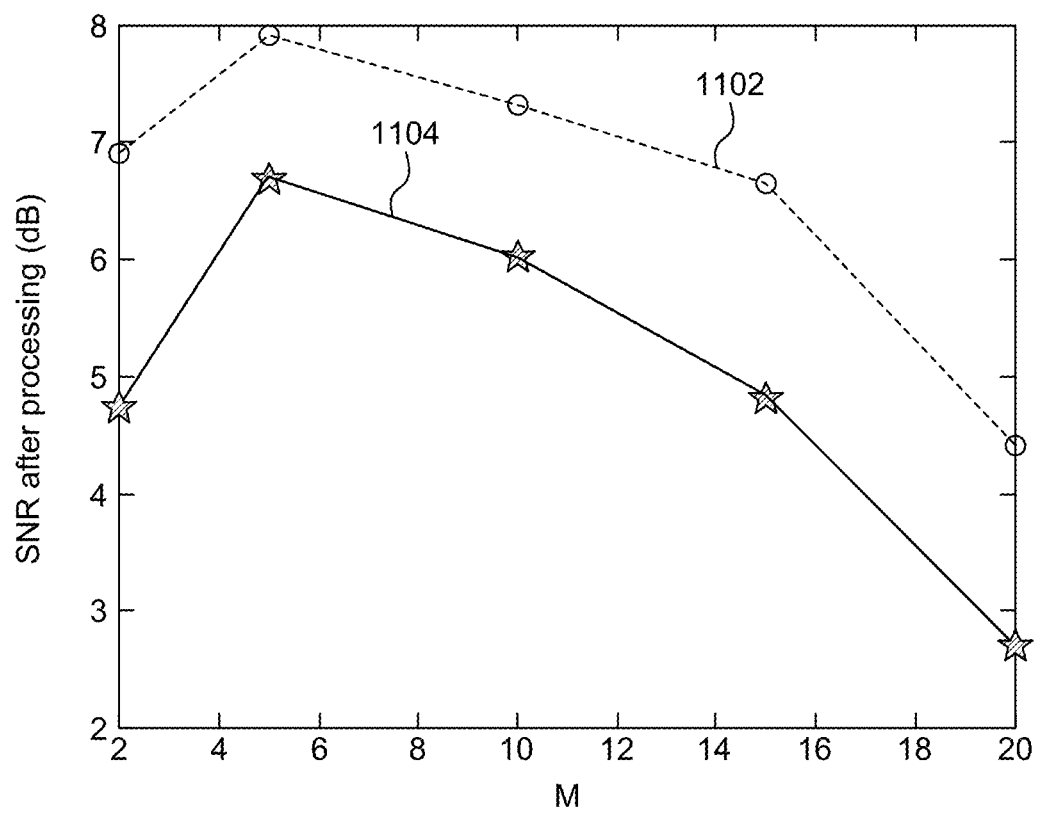
FIG. 11 depicts a comparison between SNR enhancement and various values of window size M with SNR of received data is −5 dB, according to certain embodiments.

FIG. 11 depicts a comparison between SNR enhancement and various values of window size M, where SNR of the received data is −5 dB. As known in the art, the window size M is crucial, and the blind channel estimation performance depends on it. The blind algorithm is highly dependent on the structure of the channel matrix $H_M$. Therefore, it is shown in FIG. 11 that when the window size M has a small value, the structure of the channel matrix is poor and the performance suffers. However, increasing the value of M beyond 15 (large channel matrix) causes the minimization error to increase, resulting in a decrease in performance.

The method as described herein results in effective seismic data transmission. As a person skilled in the art would understand, wireless seismic network poses major challenges given the voluminous amount of data that are to be transmitted from seismic sensors to the on-site data processing center. Further, the wireless transmission requires removing the wireless channel effects from seismic data, and this aspect needs to be addressed. While transmitting the seismic data wirelessly, impairments like interference, multi-path fading, and channel noise need to be considered. Therefore, in the present subject matter comprises blind system identification and deep neural networks. The method works by training the deep neural networks offline and taking into account the stationary environment of the seismic data acquisition network. As a geophone already is responsible for transmitting a tremendous amount of the data under tight timing constraints, the disclosed setup does not require sending any additional training signals to mitigate the channel effects. Furthermore, the present subject matter is suitable for real-time implementation without the use of field data for the training of deep neural networks. Experiments show that the disclosed method gives promising results when applied to the field data set.

Figure 12A:
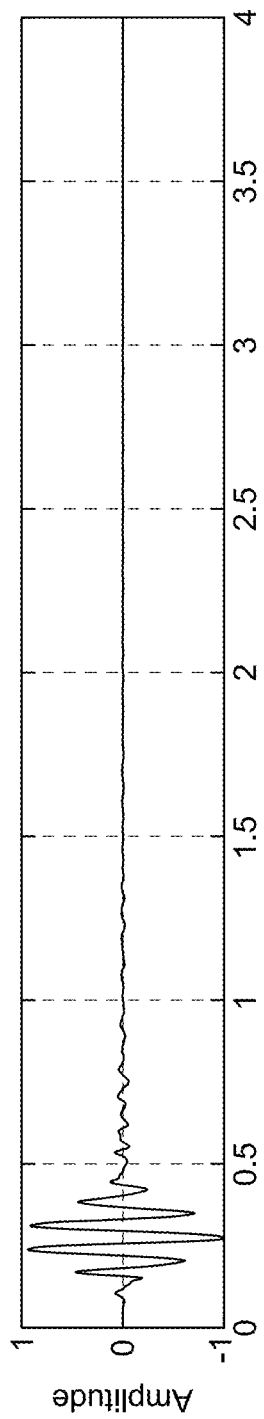
FIG. 12A depicts the original trace, according to certain embodiments.
Figure 12B:
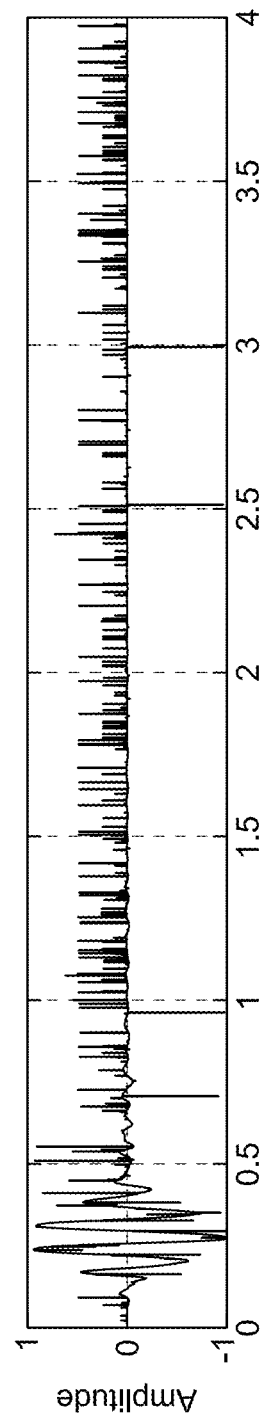
FIG. 12B depicts reconstructed trace after MLSE without denoising, according to certain embodiments.
Figure 12C:
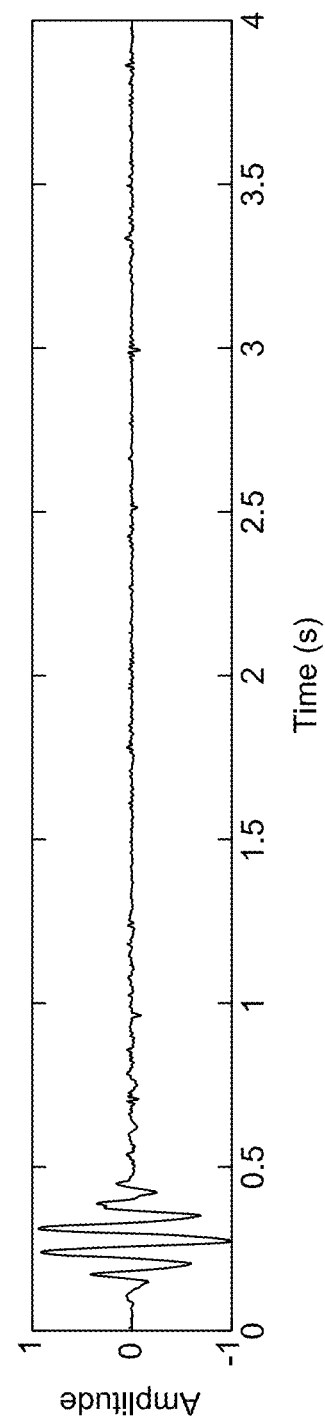
FIG. 12C depicts reconstructed trace after denoising, according to the certain embodiment.
Figure 13A:
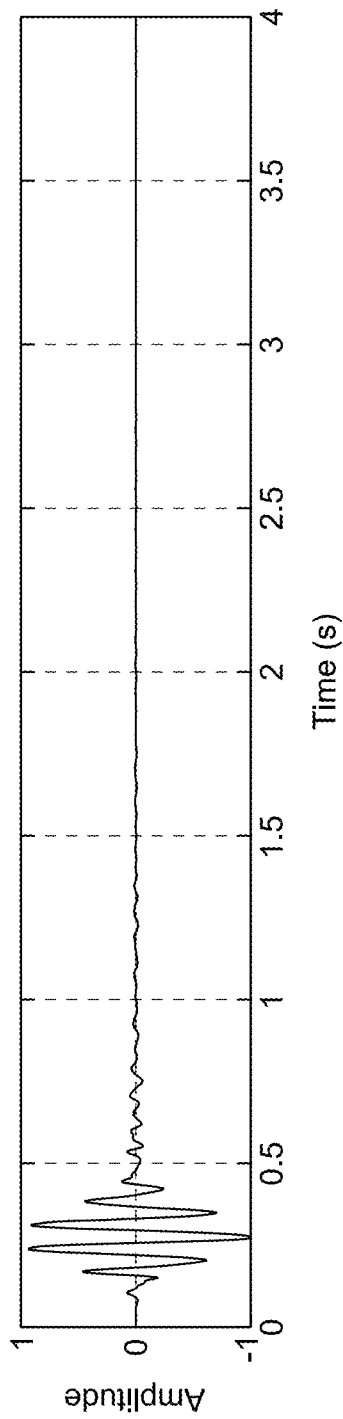
FIG. 13A depicts the original trace, according to certain embodiments.
Figure 13B:
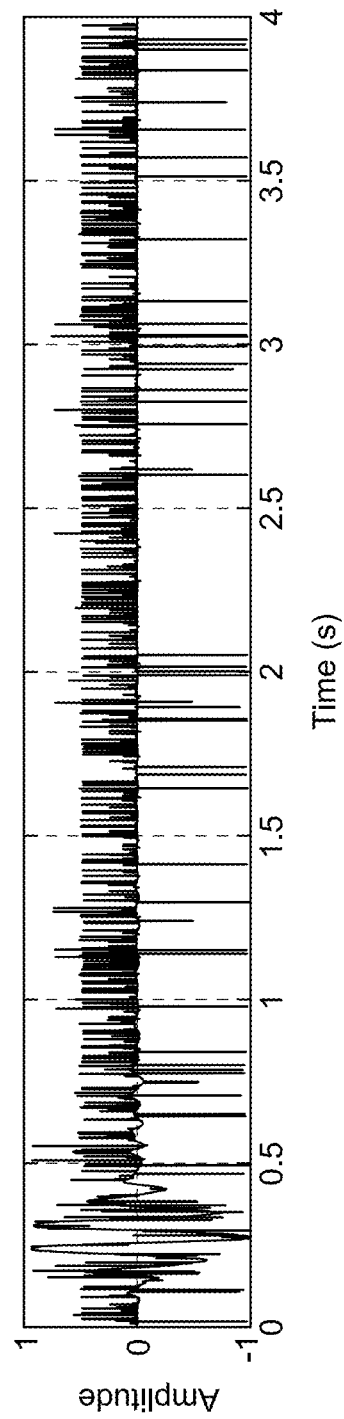
FIG. 13B depicts reconstructed trace after MLSE without denoising, according to certain embodiments.
Figure 13C:
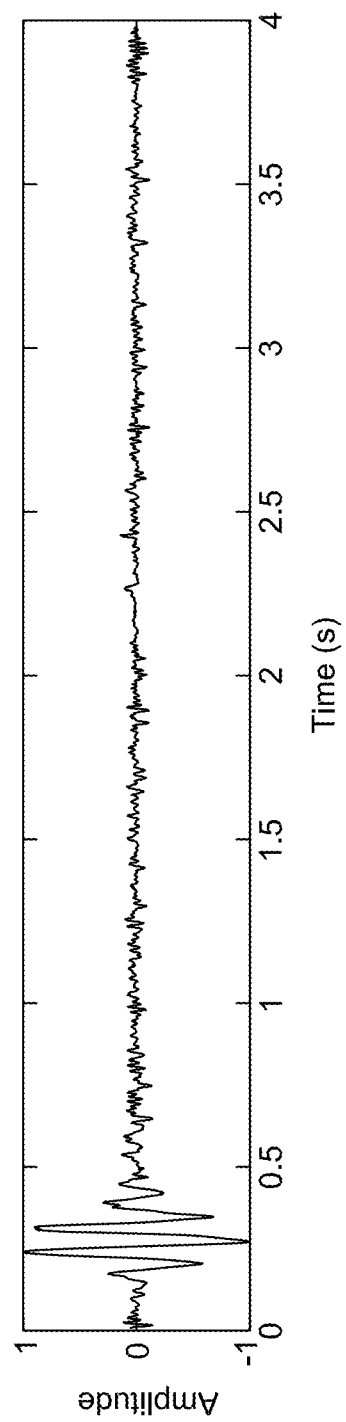
FIG. 13C depicts reconstructed trace after denoising, according to the certain embodiment.

The efficacy of the disclosed method is further highlighted in FIG. 12A FIG. 12C and FIG. 13A-FIG. 13C. In one implementation, the method efficiently suppresses the noise in the worst case when the SNR of the received data is −10 dB. FIG. 12A-FIG. 12C depict a single tract SNR enhancement (SNR of received data is −8 dB). FIG. 12A depicts an original trace, FIG. 12B depicts a reconstructed trace after MLSE, and FIG. 12C depicts a reconstructed trace after SNR enhancement. FIG. 13A-FIG. 13C depict a single tract SNR enhancement with SNR of received data is −10 dB. FIG. 13A depicts an original trace, FIG. 13B depicts a reconstructed trace after MLSE, and FIG. 13C depicts a reconstructed trace after SNR enhancement. FIGS. 12A-12C and 13A-13C emphasize the need for robust processing of the wirelessly transmitted seismic data is highly desirable.

Figure 14:
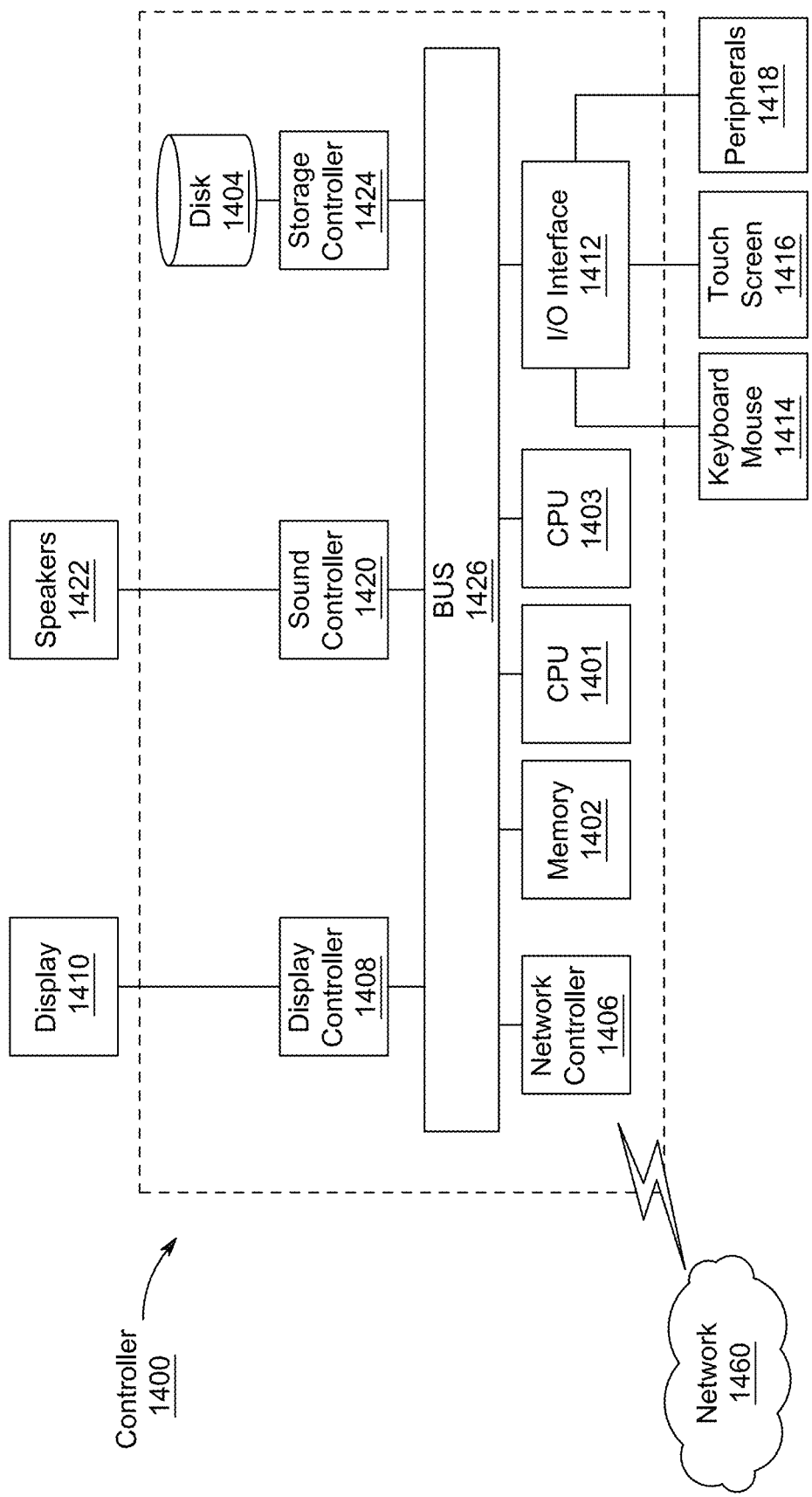
FIG. 14 illustrates a hardware description of the computing environment of the apparatus, according to certain embodiments.

Next, further details of the hardware description of the computing environment of FIG. 3 according to exemplary embodiments are described with reference to FIG. 14. In FIG. 14, a controller 1400 is described as a representative of the controller 206 of FIG. 2 in which the controller is a computing device that includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1401, 1403 and an operating system such as Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G and 4G wireless cellular systems. The wireless network can also be Wi-Fi, Bluetooth. or any other wireless form of communication that is known.

The computing device further includes a display controller 1408, such as a NVIDIA GeForce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general-purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
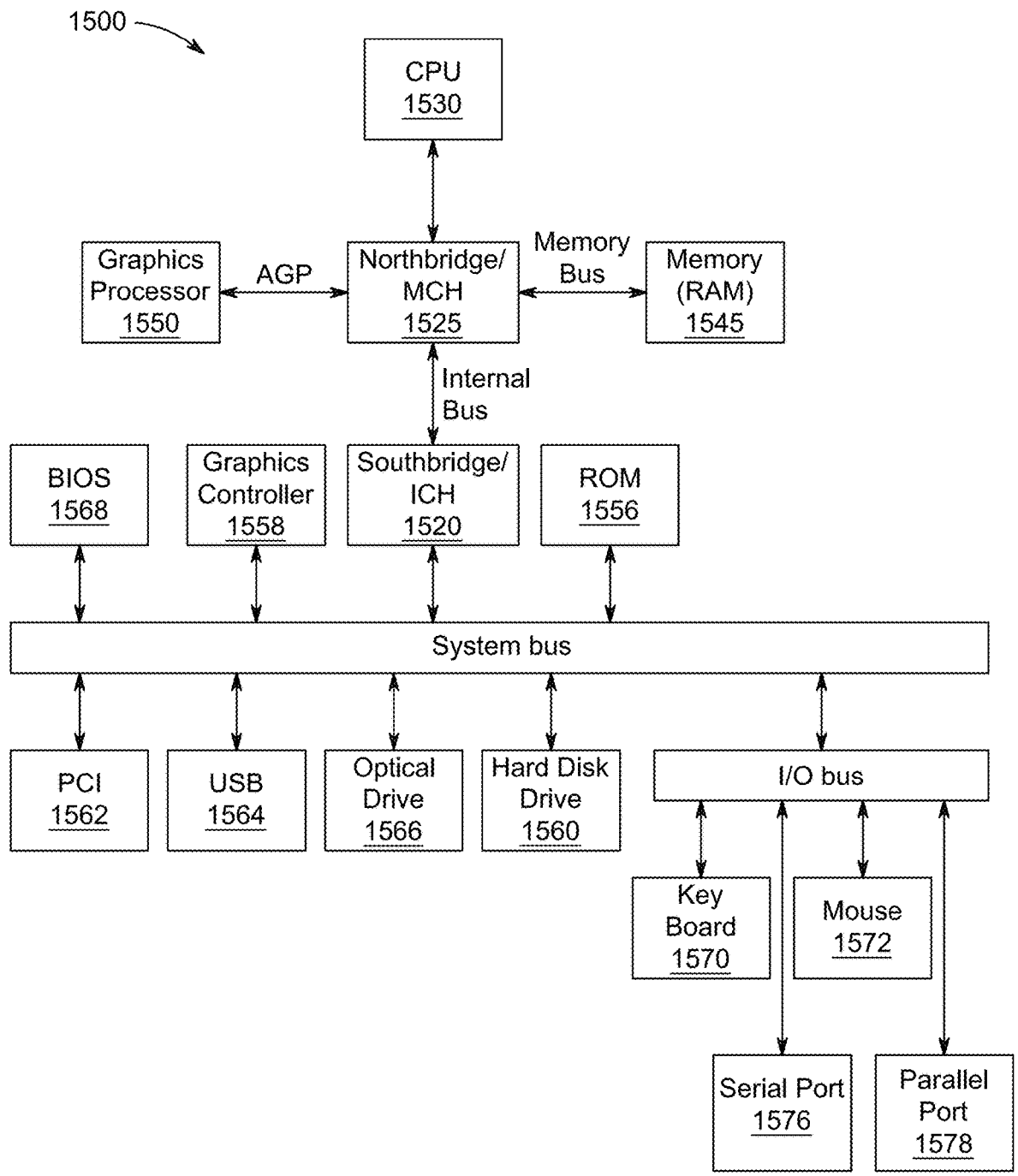
FIG. 15 shows a schematic diagram of a data processing system, according to certain embodiments.

FIG. 15 shows a schematic diagram of a data processing system, according to certain embodiments, for performing the functions of the exemplary embodiments. The data processing system is an example of a computer in which code or instructions implementing the processes of the illustrative embodiments may be located.

In FIG. 15, data processing system 1500 employs a hub architecture including a north bridge and memory controller hub (NB/MCH) 1525 and a south bridge and input/output (I/O) controller hub (SBICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
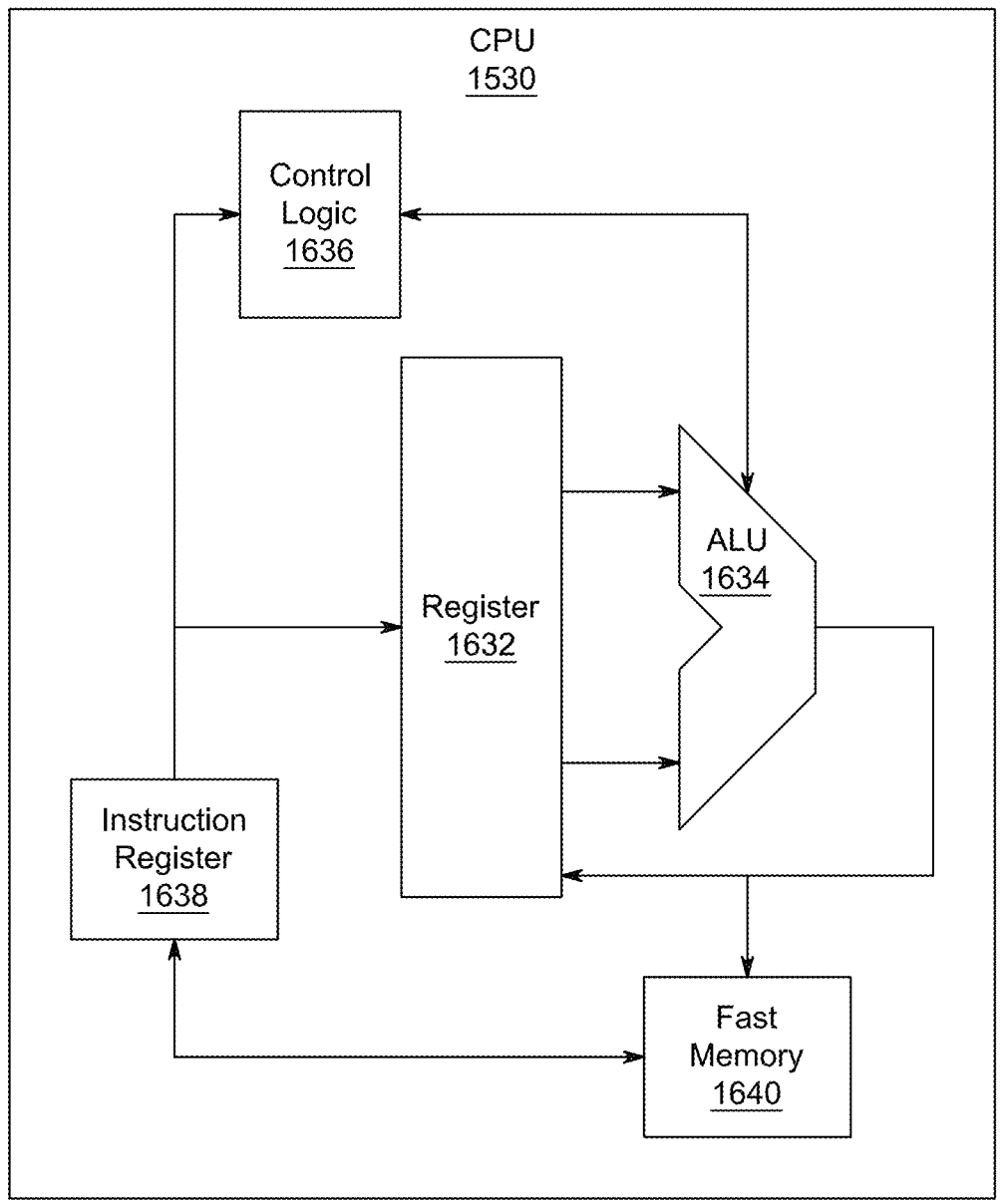
FIG. 16 shows one implementation of CPU, according to certain embodiments.

For example, FIG. 16 shows one implementation of CPU 1530. In one implementation, the instruction register 1638 retrieves instructions from the fast memory 1640. At least part of these instructions is fetched from the instruction register 1638 by the control logic 1636 and interpreted according to the instruction set architecture of the CPU 1530. Part of the instructions can also be directed to the register 1632. In one implementation the instructions are decoded according to a hardwired method, and in some implementations the instructions are decoded according to a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1656, universal serial bus (USB) port 1564, a flash binary input/output system (BIOS) 1568, and a graphics controller 1558. PCI/PCIe devices can also be coupled to SB/ICH 1520 through a PCI bus 1562.

The PCI devices may include, for example. Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1580, a mouse 1582, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method, comprising:
propagating an initial seismic wave at or above a geological formation; then
recording a plurality of reflected seismic waves reflected from the geological formation with an array of geophones, wherein each of the reflected seismic waves is a seismic data trace;
receiving the seismic data traces at a data collection center comprising receiving circuitry and processing circuitry;
applying, with the processing circuitry, a blind system identification process to the seismic data traces to estimate a channel impulse response of the seismic data traces;
applying, with the processing circuitry, an optimum equalization process to the seismic data traces to obtain estimated seismic data based on the channel impulse response;
processing, with the processing circuitry, the estimated seismic data to generate processed seismic data;
classifying, with the processing circuitry, the processed seismic data into a first group of seismic data each of which has a signal-to-noise ratio (SNR) less than an SNR threshold and a second group of seismic data each of which has an SNR no less than the SNR threshold; and
enhancing the SNR of each of only the first group of seismic data by first preprocessing the first group of seismic data including:
windowing each seismic data trace to provide a plurality of data sections,
applying a short time discreet cosine transform to each data section of the plurality of data sections to provide a spectra of a trace for each data section, then
denoising the data sections with a recurrent neural network (RNN) or a convolutional neural network (CNN).

2. The method of claim 1, wherein the blind system identification process is a structured-based subspace (SSS) method.

3. The method of claim 1, wherein the optimum equalization process is a maximum likelihood sequence estimation (MLSE) process.

4. The method of claim 1, wherein the estimated seismic data are processed using a short-time Fourier transform (STFT) process.

5. The method of claim 1, wherein the estimated seismic data are processed using a short-time discrete cosine transform (STDCT) process.

6. The method of claim 1, wherein the processed seismic data are classified using a fully connected neural network (FCNN) having a plurality of fully connected (FC) layers, each of which is followed by batch normalization (BN) and LeakyRule.

7. The method of claim 1, further comprising
updating, with the processing circuitry, the channel impulse response to obtain an updated channel impulse response, wherein using an optimum equalization process to obtain estimated seismic data based on the channel impulse response includes using an optimum equalization process to obtain estimated seismic data based on the updated channel impulse response.

8. The method of claim 7, wherein the channel impulse response is updated based on:

$$\bar{h}_i = \left(1 - \frac{1}{\alpha}\right)\bar{h}_{i-1} + \frac{1}{\alpha}\hat{h}_{i-1},$$

wherein $\hat{h}_i$ is the estimated channel impulse response, and $\bar{h}$ is the updated channel impulse response at the $i^{th}$ shot.

9. A system for generating seismic data and mitigating wireless channel impairment in seismic data transmission, comprising:
a seismic source configured to propagate an initial seismic wave at or above a geological formation;
an array of geophones configured to record a plurality of reflected seismic waves reflected from the geological formation, wherein each of the reflected seismic waves is a seismic data trace;
a data collection center comprising receiving circuitry and processing circuitry, wherein the processing circuitry is coupled to the receiving circuitry;
wherein the receiving circuitry is configured to receive the seismic data traces; and
wherein the processing circuitry includes program instructions to:
apply a blind system identification process to the seismic data traces to estimate a channel impulse response of the seismic data traces,
apply an optimum equalization process to the seismic data traces to obtain estimated seismic data based on the channel impulse response,
process the estimated seismic data to generate processed seismic data,
classify the processed seismic data into a first group of seismic data each of which has a signal-to-noise ratio (SNR) less than an SNR threshold and a second group of seismic data each of which has an SNR no less than the SNR threshold, and
enhance the SNR of each of only the first group of seismic data by first preprocessing the first group of seismic data including:
windowing each seismic data trace to provide a plurality of data sections,
applying a short time discreet cosine transform to each data section of the plurality of data sections to provide a spectra of a trace for each data section, then
denoising the data sections with a recurrent neural network (RNN) or a convolutional neural network (CNN).

10. The system of claim 9, wherein the blind system identification process is an SSS method.

11. The system of claim 9, wherein the optimum equalization process is an MLSE process.

12. The system of claim 9, wherein the estimated seismic data are processed using an STDCT process.

13. The system of claim 9, wherein the processed seismic data are classified using an FCNN having a plurality of FC layers, each of which is followed by BN and LeakyRule.

14. The system of claim 9, wherein the processing circuitry further includes program instructions to update the channel impulse response to obtain an updated channel impulse response, wherein the optimum equalization process provides estimated seismic data based on the updated channel impulse response.

15. The system of claim 14, wherein the processing circuitry further includes program instructions to update the channel impulse response based on:

$$\bar{h}_i = \left(1 - \frac{1}{\alpha}\right)\bar{h}_{i-1} + \frac{1}{\alpha}\hat{h}_{i-1},$$

wherein $\hat{h}_i$ is the estimated channel impulse response, and $\bar{h}$ is the updated channel impulse response at the $i^{th}$ shot.

\* \* \* \* \*